(No Model.) 3 Sheets—Sheet 2.
W. HIPPERLING.
CAN SOLDERING MACHINE.
No. 406,647. Patented July 9, 1889.
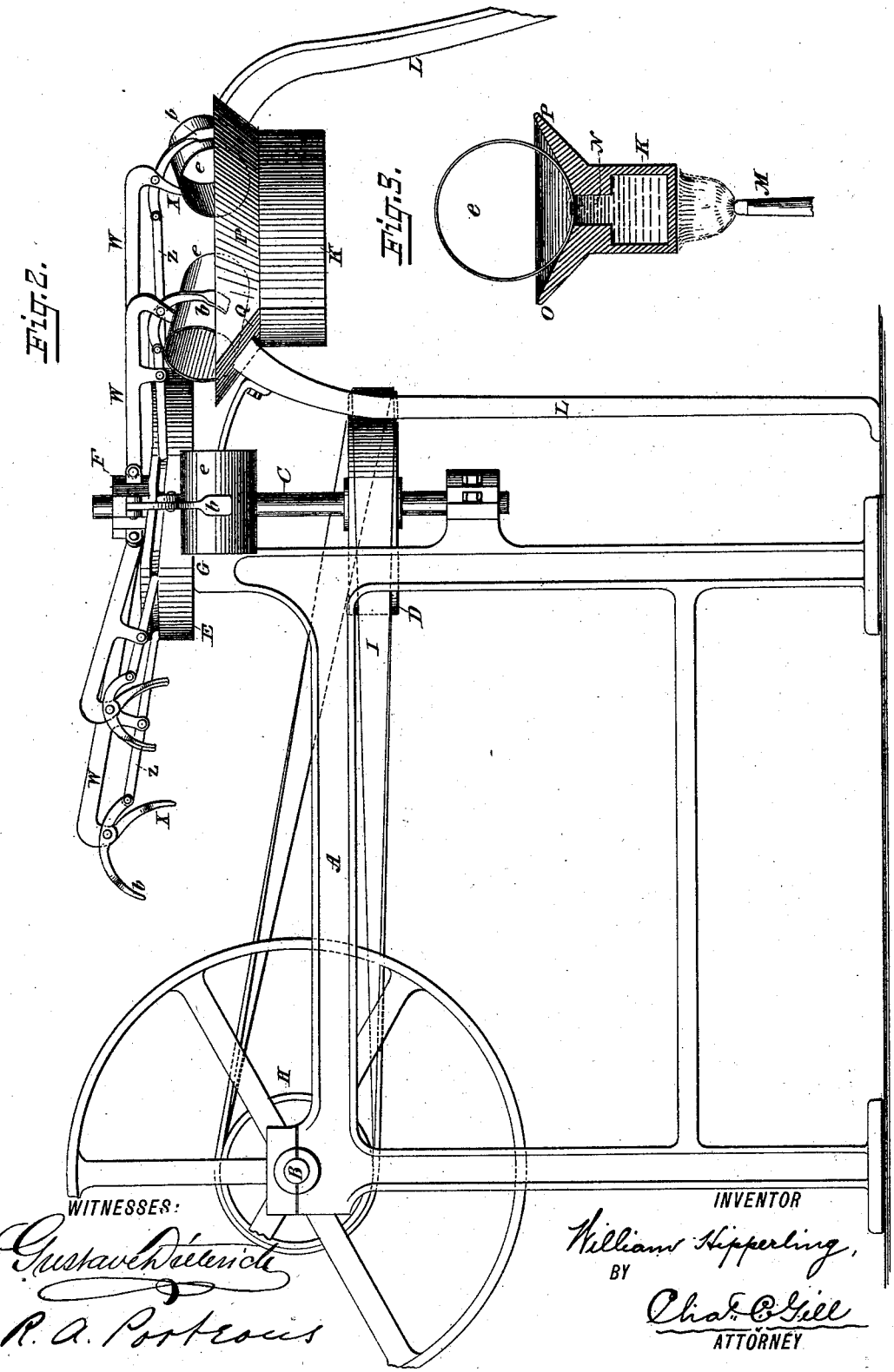
WITNESSES:
Gustave Dieterich
R. A. Porteous
INVENTOR
William Hipperling,
BY
Chas. E. Gill
ATTORNEY (No Model.) 3 Sheets—Sheet 3.
W. HIPPERLING.
CAN SOLDERING MACHINE.
No. 406,647. Patented July 9, 1889.
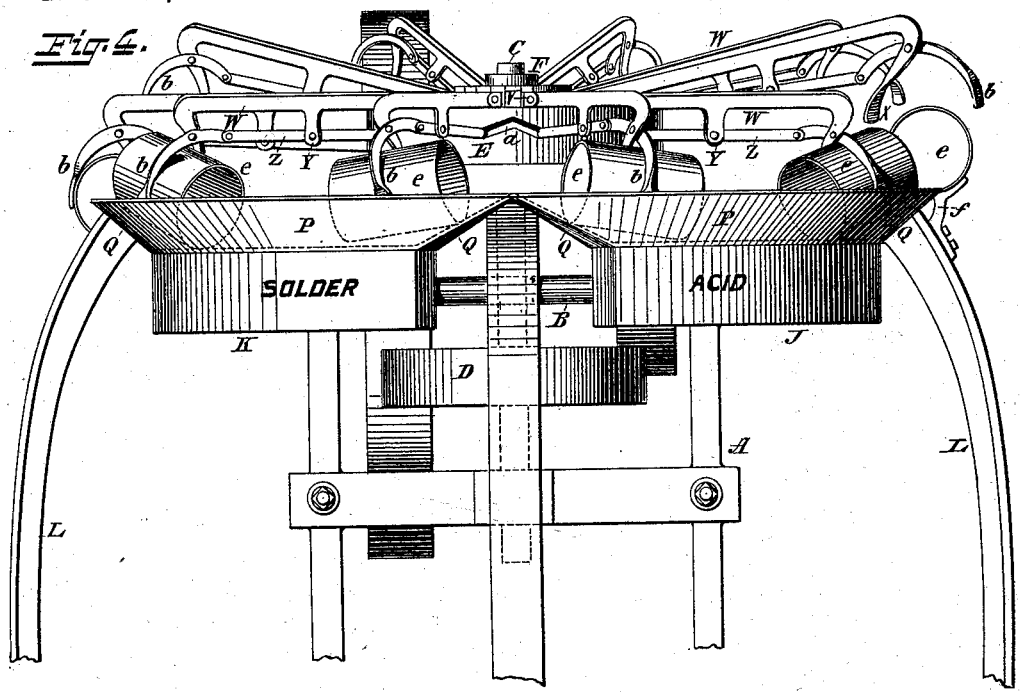
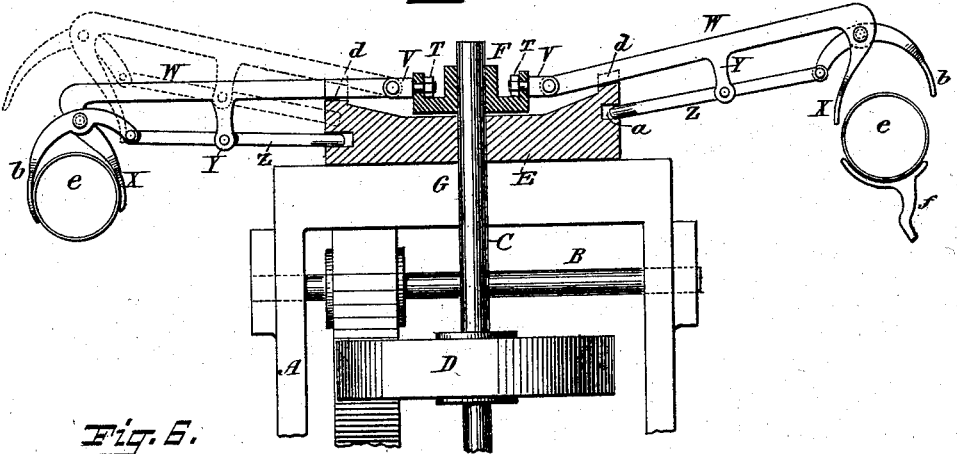
WITNESSES:
Gustave Dieterich
R. A. Porteous
INVENTOR
William Hipperling.
BY
Chas. C. Gill
ATTORNEY

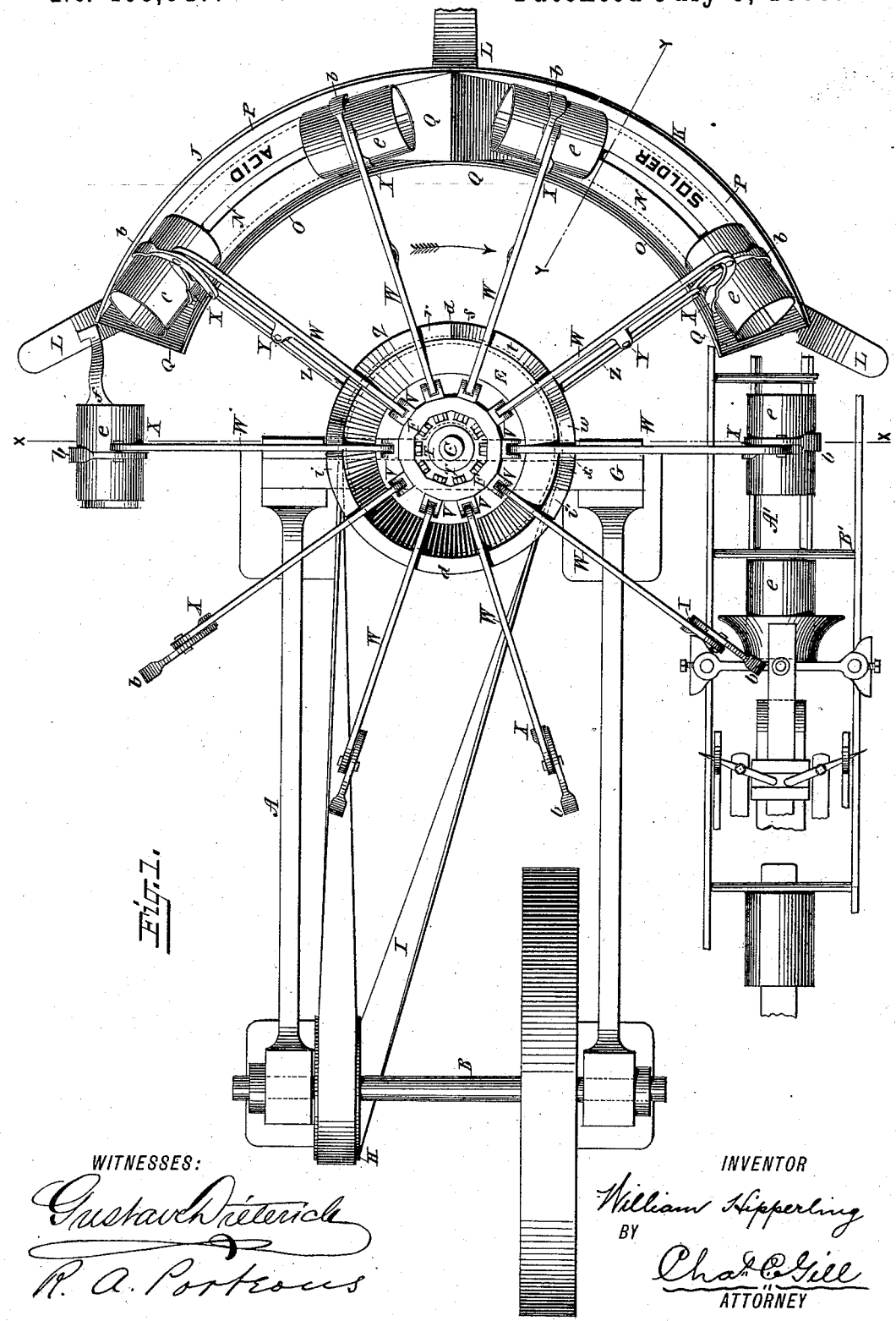

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

CAN-SOLDERING MACHINE.

SPECIFICATION forming part of Letters Patent No. 406,647, dated July 9, 1889.

Application filed September 17, 1888. Serial No. 285,605. (No model.)

*To all whom it may concern:*

Be it known that I, WILLIAM HIPPERLING, a citizen of the United States, and a resident of New York, in the county of New York and State of New York, have invented certain new and useful Improvements in Machines for Soldering the Seams of Tin Cans, of which the following is a specification.

The invention relates to improvements in machines for soldering the seams of tin cans; and it consists in mechanism, hereinafter more particularly described and claimed, embracing an acid bath and a solder bath, and a series of rotating clamping-arms adapted to be opened and closed by a cam, arranged to clasp the cans and carry them first through the acid or flux bath, then through the solder bath, and finally deliver them to devices for wiping any superfluous solder from the seams.

Referring to the accompanying drawings, forming a part of this specification, Figure 1 is a top plan view of a machine embodying the elements of the invention; Fig. 2, a side elevation of same; Fig. 3, a vertical section on the dotted line Y Y of Fig. 1; Fig. 4, an end view of the machine; Fig. 5, a vertical section on the dotted line X X of Fig. 1; and Fig. 6 is an enlarged side elevation of the cam for opening and closing the clamps to clasp or release the can-bodies under treatment.

In the drawings, A designates the frame of the machine, supporting at one end the transverse driving-shaft B and at the other end the vertical shaft C, upon which is mounted the belt-wheel D and the smaller wheel F, the wheels D F in use rotating with the shaft C. The shaft C passes loosely through the stationary cam-wheel E, which is immediately below the wheel F, and is supported on the transverse bar G of the frame A. Upon the driving-shaft B is mounted the belt-wheel H, and power is transmitted from this wheel to the belt-wheel D on the vertical shaft C through the belt I.

The driving-power described for rotating the vertical shaft C may be conveniently used, or other well-known means for imparting motion to this shaft may be substituted therefor, according to the wish of the manufacturer and the arrangement of the shafting in the factory where the machine may be employed.

At the front end of the frame A are the receptacles, (lettered J K, respectively,) supported on legs L and describing the arc of a circle. The receptacle J is for holding acid or flux— such as is commonly used in connection with soldering—and the receptacle K is intended for solder, which will be preserved in a liquid condition by heat from a burner M. The interior of the receptacles J K is more clearly shown in Fig. 3, wherein it will be observed that the receptacle has a contracted mouth N of sufficient width to permit the solder in same to flow over the seam of the can while the latter is moved through it, as hereinafter described.

The receptacle K will be filled with the solder up to the upper edge of the mouth N, and its tendency will be to form a convex bead extending from one side of said mouth to the other, as shown by dotted lines in Fig. 3, through which the can may be moved and its seam soldered without danger of the material spreading unduly over the can. The upper portion of the receptacles J K have diverging sides O P, which form guides for the cans, and at the ends of each of said receptacles are the inclines Q, extending upward to and meeting the upper edges of the sides O P, said inclines constituting the ends of the upper portion of said receptacles and being directly in the line of travel of the cans.

In the rim of the wheel F are loosely secured by nuts T the bifurcated radial arms V, which are capable of turning in their sockets, and in which are pivoted the inner ends of the clamping-levers W, whose outer ends form jaws X, shaped to clamp against one side of the cans. Each of the levers W carries a dependent arm Y, in which is pivoted a rocking lever Z, the inner end of which enters and is adapted to travel in the annular groove *a* of the cam-wheel E, while the outer end of each lever Z is pivoted to the shank end of a clamping-jaw *b*, which is pivoted to the jaws X, above mentioned, and is shaped to clamp the side of the cans opposite to that in contact with said jaw X. The jaws X and *b* at the outer end of each of the clamping-levers W form a clamp adapted to clasp the can on opposite sides and move it through the acid and solder baths and finally deliver it to the devices for wiping the seams, as hereinafter more fully set forth. The clamping-levers W rest upon and travel along the upper cam edge $d$ of the cam-wheel E, and said levers are by the configuration of said cam edge either raised or lowered, in order that one point the clamps may clasp the cans $e$, one after another in succession, take them from the rest or feed-table $f$, and then move them through the acid and solder receptacles J K, and finally deliver them to the wipers. While the levers W are moving along the cam edge $d$ the inner ends of the rocking levers Z are traveling in and controlled by the annular cam-groove $a$. That portion of the cam edge $d$ toward the driving-shaft B and between the points indicated by the letters $i'$ $i$ is a plain surface and constitutes the highest part of the cam, and the annular groove $a$ between these points is parellel with said plain surface and higher than the other parts of the groove, and while the levers W Z are moving along this portion of the cam-wheel they will be in their elevated position and the jaws X $b$ will be open, as shown in Figs. 2 and 5. As soon, however, as the levers W Z reach the point $i$ of said cam-wheel the lever W drops down the incline $j$ thereof (see Fig. 6) and the lever Z moves down the incline $m$ of the groove $a$, and the jaws X $b$ are caused thereby to clasp the can $e$ upon the rest or table $f$. During the continued revolution of the wheel F the levers W Z move along the level surfaces $n$ $n'$, causing the clamping-jaws X $b$ to carry the can from the table $f$ to a point directly over the edge of the acid-receptacle J, after which the levers W Z move down the inclined surfaces $o$ $o'$ and turn inward, as shown in Fig. 1, whereby the clamping-jaws are permitted to move the can in an inclined position down the first incline Q of said acid-receptacle, bringing the forward edge of the can to the line of acid at the open mouth N of said receptacle. The levers W Z then move along the level surfaces $q$ $q'$, (see Fig. 6,) during which time the can is moved in a horizontal position, its seam passing through the acid bath, after which the levers W Z move up the inclined surfaces $r$ $r'$, and the jaws X $b$ are enabled to carry the can up the second incline Q of the acid-receptacle, any superfluous acid being in the meantime permitted to drip back into the bath from the inclined can. After this the levers W Z move down the inclined surfaces $s$ $s'$ and the can is carried down the first incline Q of the solder-receptacle K. They then move along the level surfaces $t$ $t'$, the can meanwhile being carried through the solder bath and then up the inclined surfaces $u$ $u'$, the can at this time being moved in an inclined position up the second incline Q of the solder-receptacle, any superfluous solder dripping back, after which the levers W Z move along the level surfaces $w$ $w'$, and the can carried to the point where it is to be deposited, this in the present instance being on the guideway A', upon reaching which the lever W quickly descends into the depression $x$, while the lever Z rides up the incline $x'$, thus opening the jaws X $b$ and leaving the can free for further treatment. The levers W Z then move along the higher surfaces of the cam between the points $i'$ $i$ preparatory to clasping another can at the table $f$ and carrying it through the acid and solder baths, respectively. The movement of one pair of the levers W Z has been described in detail, and the same description may apply to any of the levers W Z shown, since they all have corresponding movements and follow one another in rapid succession, each carrying a can through the baths. As above described, the shaft C and wheel F have a continuous movement, while the cam-wheel E remains stationary, and the continuous movement of the wheel F is imparted to the levers W Z, whereby they are caused to travel around the cam-wheel E. After the cans have been deposited upon the guideway A' they may be carried against internal and external wipers by a chain B', as described in Letters Patent No. 366,482, issued to my assignees July 12, 1887, or be otherwise disposed of, according to the wish of the manufacturer.

What I claim as my invention, and desire to secure by Letters Patent, is—

1. In a machine for soldering the seams of tin cans, the receptacles for acid and solder arranged in the arc of a circle, combined with a series of rotating clamps for carrying the cans through the baths and a cam for opening and closing the clamps, said clamps consisting of the levers W Z and jaws X $b$, substantially as and for the purposes set forth.

2. In a machine for soldering the seams of tin cans, the receptacles for acid and solder arranged in the arc of a circle, combined with the wheel F, clamping-levers W, radiating therefrom and having jaw X, the rocking levers Z, carried by the levers W, the pivoted jaw $b$, and the cam having cam edge $d$ and groove $a$, substantially as set forth.

3. In a machine for soldering the seams of tin cans, the horizontal acid and solder receptacles J K, having inclinations Q at their ends and arranged in the arc of a circle, combined with the vertical driving-shaft C, the wheel F thereon, a series of rotating clamps connected with said wheel, and a cam-wheel E, for opening and closing said clamps, said cam having elevations and depressions arranged to cause the clamps to tilt the cans after leaving the baths, substantially as and for the purposes set forth.

Signed at New York, in the county of New York and State of New York, this 15th day of September, A. D. 1888.

WILLIAM HIPPERLING.

Witnesses:
CHARLES C. GILL,
ROBERT A. PORTEOUS.